Oct. 4, 1949.  J. W. BROWN, JR  2,483,454
METHOD OF RESISTANCE WELDING FINNED TUBES
Filed Aug. 31, 1946  2 Sheets-Sheet 1
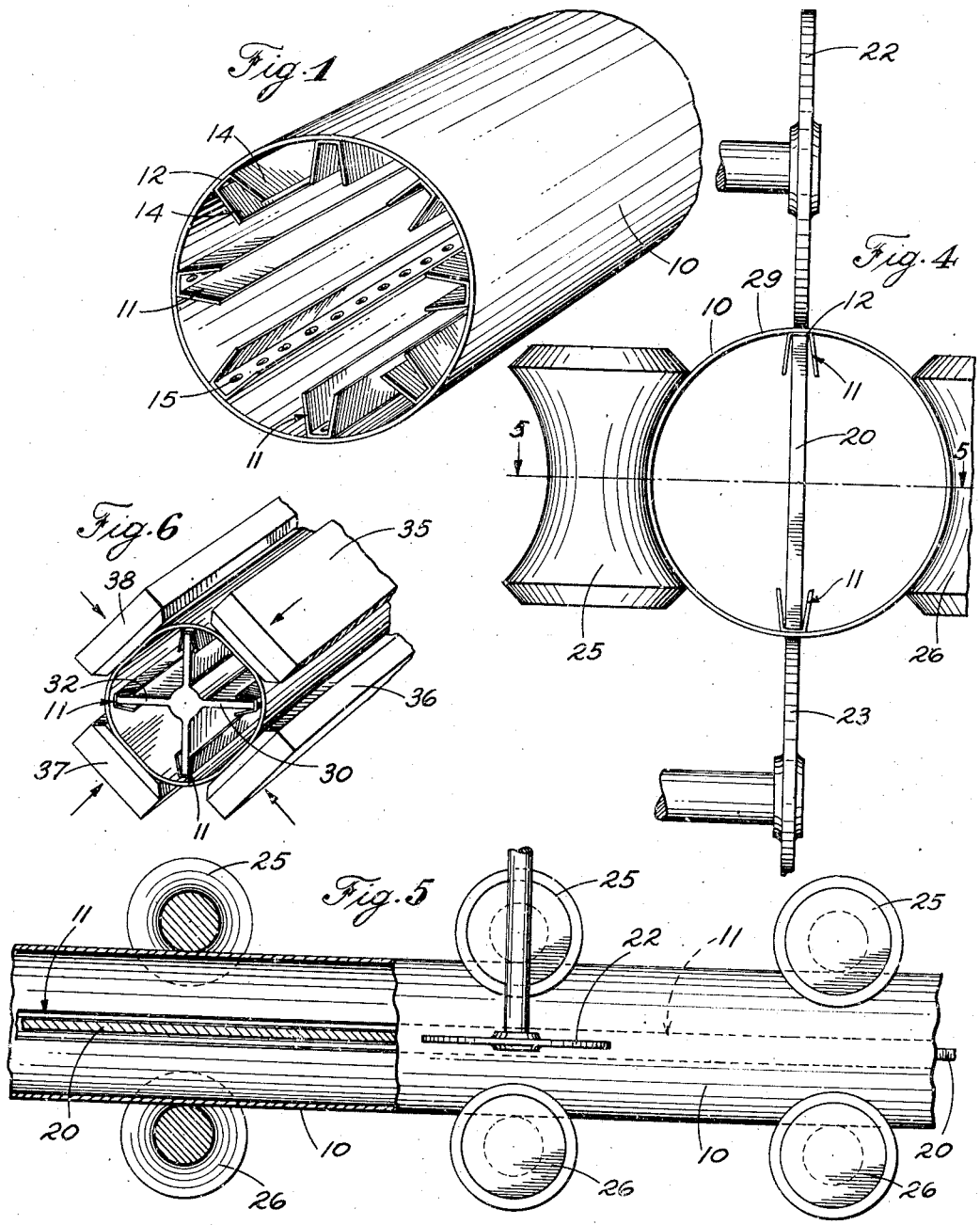
INVENTOR.
JOHN W. BROWN, JR.
BY
Bosworth & Sessions
ATTORNEYS Oct. 4, 1949.  J. W. BROWN, JR  2,483,454
METHOD OF RESISTANCE WELDING FINNED TUBES
Filed Aug. 31, 1946  2 Sheets-Sheet 2
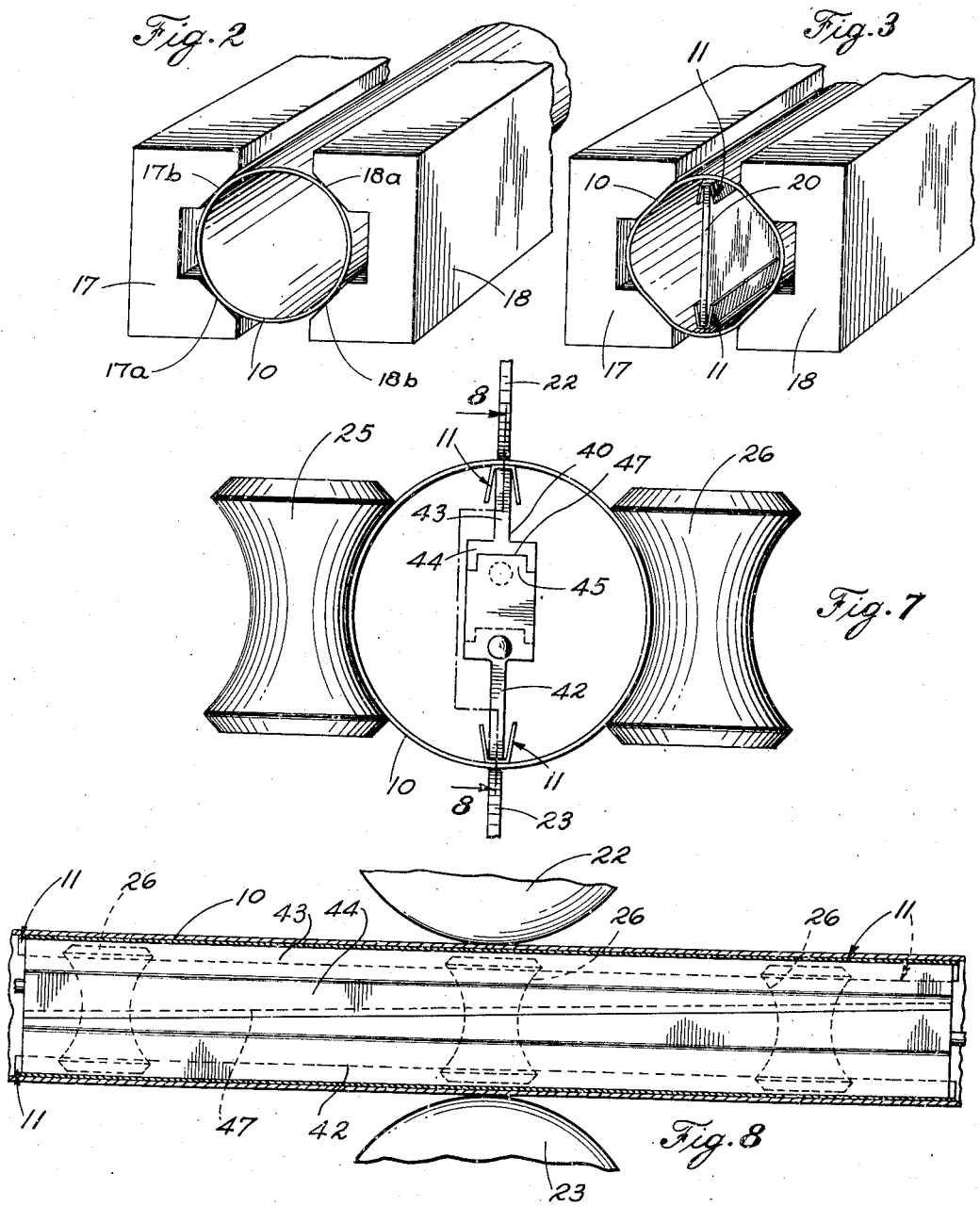
INVENTOR.
JOHN W. BROWN, JR.
BY
Bosworth & Sessions
ATTORNEYS Patented Oct. 4, 1949

2,483,454

UNITED STATES PATENT OFFICE 2,483,454

METHOD OF RESISTANCE WELDING FINNED TUBES

John W. Brown, Jr., Elyria, Ohio, assignor to Brown Fintube Company, Elyria, Ohio, a corporation of Ohio Application August 31, 1946, Serial No. 694,227

6 Claims. (Cl. 219—10)

This invention relates to a method of attaching metallic heat conducting fin members to the interior of metal tubes for producing internally finned tubes adapted particularly for use as heat exchanger conduits.

In the manufacture of heat exchangers of various types, it is desirable to increase the area of the fluid conducting tubes or conduits by securing fins of various types to the interior of the tubes. In order to insure proper paths for the flow of heat between the fin members and the walls of the tubes themselves, it is desirable that the fin members be welded to the tubes to provide a continuous metallic path for the conduction of heat. Resistance welds securing the bases of the fin members to the tubes are especially advantageous, but the resistance welding of fins to the interior of tubes and particularly tubes of comparatively small diameter presents difficulties because the tubes are too small to receive electrodes of the type ordinarily employed in conventional resistance welding machines.

A general object of the present invention is the provision of a method of rapidly and economically welding fins to the inside of tubes without requiring expensive special equipment, the tubes and fins preferably being composed of ferrous material. A further object is to provide a method of welding fins to the inside of tubes in which the resiliency of the tube wall and its tendency to retain a given shape when distorted within its elastic limit is used to hold the fins and tube in intimate contact during a welding operation. An additional object is to provide a method in which a tube is flexed within its elastic limit to increase its dimension along one diameter to receive an assembly including a spacing conductor bar and a fin or fins that in overall width is slightly greater than the tube internal diameter; and then releasing the tube to permit it to grip the fin or fins and the spacing conductor during a welding operation. A still further object is to weld fins to the inside of a tube by passing a welding current through the fins and a connecting conductor bar from one side of the tube to the other rather than around the tube wall from one side to the other.

Preferably I accomplish the above and other objects of the invention by providing a tube of such light gauge with respect to its diameter that the current path around the tube between two diametrically opposed points thereon will be of substantial resistance. Within such a tube I position a pair of fin members, for example, U-channel section members, with their axes extending substantially parallel to the axis of the tube and with the bases of the fin members engaging diametrically opposite inner surfaces of the tube. Between the bases of the fin members, I position a conductor bar or mandrel composed of a highly conductible metal such as copper, and having a thickness such that it will fit within and engage the bases of the channel section fin members. The total of the width of the conductor bar and the thickness of the bases of the fins makes an assembly that is slightly greater than the internal diameter of the tube in which it is to be mounted. The resiliency of the tube is such that it may be flexed to increase its dimension along one diameter to receive the assembly of conductor bar and the fin or fins that are to be welded to the inside of the tube. The flexed tube is then released and as it resumes its original shape it acts to clamp the fin or fins, the spacing conductor bar and itself together with a pressure that permits properly welding the fin base or bases to the tube. The conductor bar preferably is as long as the fin members to be welded to the tube. As an alternative construction I provide a conductor bar that is expandable after it and the fins are placed in an unflexed tube to clamp the fin bases against the tube by slightly flexing the latter so its resiliency applies a clamping force.

The welding operation is carried out by guiding the tube with the assembly of fin members and conductor bar through a suitable welding machine, preferably of the type embodying roller electrodes, by means of a jig or the like engaging the tube somewhat in the manner described and illustrated in my Patent No. 2,298,249, issued October 6, 1942. Pressure is exerted by the welding rolls against the exterior of the tube in the zone just outside the zones of engagement of the fin members with the interior of the tube in sufficient amount to provide proper welding pressure between the tube and rolls. Sufficient force is applied between the rolls and the rigid conductor bar to produce the proper welding pressure between the inner surface of the tube and the bases of the fin members in the zone where the electrodes engage the exterior of the tube. Current is caused to flow in the usual manner between the electrodes, an intermittent, alternating current controlled by a control of the thyratron type preferably being employed, and simultaneously the assembly of tube, fin members, and conductor bar is moved with respect to the electrodes to produce a series of resistance welded areas securely joining the bases of the fin members and the inner surfaces of the tube. Preferably, the timing and the speed of movement are correlated with the width of the electrode rolls and the conductor bar and the thickness of the fin members to produce welded areas of the type described and claimed in my Patent No. 2,261,137, issued November 4, 1941, thereby insuring the joining of fin members to the tube by paths which are of sufficient area to provide for the efficient transfer of heat between the fin members and the tube.

In such an operation, the flow of current between the two electrodes is divided between the paths around the circumference of the tube and the path through the bases of the fin members and the intervening conductor bar and it would appear that it would be impossible or at least impractical to produce satisfactory welds under such conditions. However, I have discovered that by controlling the resistance of the tube itself, the welding operation can be carried out without difficulty. Thus, in order to prevent excessive loss of current and to make possible the carrying out of the operation without burning the exterior of the tube where it comes in contact with the electrode, the gauge of the metal of the tube preferably should be as thin as possible, consistent with the requirements for the services to which the tube is to be put. The resistance of the path around the tube between the electrodes increases with the diameter of the tube and is reduced with an increase in thickness of the wall of the tube. In the tube as great a resistance as possible is desirable. The conductor bar extending between the bases of the fin members may be made of a highly conductive material and of such thickness that its resistance is negligible while the resistance of the tube itself must be maintained at a substantial value. For example, with a tube of small diameter, i. e., about three-quarters of an inch, the wall thickness of the tube preferably should not exceed .020 inch.

With a larger tube, for example, four inches in diameter, a wall thickness as great as three-thirty-second of an inch may be employed. The nature of the materials also has an effect on the size of tube with which my method can be carried out. Generally speaking, I prefer to employ tubes composed of ferrous materials, for their resistance is substantially greater than the resistance of the copper mandrel bar employed within the tube. Stainless steels have greater electrical resistance than ordinary low carbon steels, and thus for a given diameter, the welding operation can be carried out with a greater tube wall thickness for stainless steel tubes than is possible with tubes of ordinary low carbon steel.

Referring now to the drawings: Figure 1 is a perspective of a preferred form of an internally finned tube made according to my invention; Figure 2 is a perspective illustrating the tube in position between a pair of flexing dies; Figure 3 is a perspective showing the flexed tube with the conductor bar and fins in position; Fig. 4 is an end elevation showing a tube positioned between the welding electrodes; Figure 5 is a plan view, partially in section, illustrating the longitudinal relation of the parts during the welding operation; Figure 6 is a view similar to Figure 3 showing a tubular member flexed to receive a cruciform shaped conductor bar; Figure 7 is an end elevation similar to Figure 4 showing an assembly with an expandable conductor bar; and, Figure 8 is a plan view, partially in section, as indicated by the lines 8—8 on Figure 7, illustrating the longitudinal relation of the parts during the welding operation.

As shown in Figure 1 a tube embodying my invention may comprise a tube 10 having a plurality of channel section fin members 11 welded to the interior thereof in diametrically opposite pairs. Each fin member comprises a base portion 12 from which project flanges 14. The base portion of each fin member is welded to the interior of the tube by a series of welded areas 15 and the flanges project inwardly from the base portion providing the tube with the desired extended surface for increasing the rate of heat transfer between a commodity flowing within the tube and the tube itself. The fin members preferably extend substantially parallel to the axis of the tube as shown and thus offer little resistance to the flow of fluid through the tube. The tube may be of any reasonable diameter and length, my method being adapted to the production of lengths of tube several feet long. While the method may be employed with tubes of relatively large diameter, it finds its greatest value in the production of tubes of small diameter, for example, from three-quarters of an inch or less to five or six inches, i. e., tubes within which it is impractical to use an ordinary welding electrode.

The steps of my preferred method are illustrated somewhat diagrammatically in Figures 2 through 5 inclusive. As shown in Figure 2, the first step is to position a tube 10 between a pair of flexing dies 17 and 18 by which to increase slightly, within the tube elastic limits, the dimension of the tube along one diameter. This is accomplished by moving the flexing dies toward each other so the surfaces 17a and 18a and the surfaces 17b and 18b move closer to each other and slightly compress the tube. The result of this motion of the dies is to decrease the diametrical dimensions of the tube along two lines at substantially right angles to each other and extending between the points of contact of the tube with the die surfaces 17a—18a and 17b—18b. The deformation of the tube causes its dimension along a vertical diameter indicated in Figure 2 to increase slightly to a size sufficient to receive the assembly of conductor bar and fins whose total width is slightly in excess of the normal internal diameter of the tube.

The two channel piece fin members 11 are positioned along opposite edges of a copper conductor bar 20 as shown in Figures 3 and 4 and by it are held with their base portions 12 in engagement with substantially diametrically opposite portions of the interior surface of the tube. The conductor bar has sufficient thickness to provide a current path that is of substantially less electrical resistance than a path from one side of the tube to the other through the tube itself. This is to insure that substantially all of the welding current will pass through the bases 12 of the fins and substantially none around the annulus of the tube.

The total width of the assembled conductor bar and the two base portions 12 of the fins 11 will be slightly greater than the normal internal diameter of the tube and this assembly may be inserted readily within the tube by virtue of the flexing operation accomplished by the dies 17 and 18. After the assembly has been inserted in place the dies are retracted and the tube 10 is permitted to resume its original shape in so far as it is permitted to do so by the oversize assembly of fins and conductor bar. The resiliency of the tube will cause it to clamp tightly together the tube and the aforesaid assembly preparatory to application of a welding current.

Although the fins have been described as channel shaped it will be apparent that they may take other forms and instead of being U-shaped may be L-shaped. Similarly it is not essential to the invention that a fin be held on each side of the conductor bar. If desired only one fin need be used in the assembly with the conductor bar so long as the over-all width of the conductor bar added to the thickness of the fin base is slightly greater than the internal diameter of the tube 10.

After a tube, and an assembly of fin members and conductor bar, is completed as described above it is positioned in a suitable welding machine which is not entirely illustrated herein, but which may be of conventional construction, embodying a pair of electrode rolls 22 and 23 (Figure 4). The machine is provided with a suitable source of current, suitable controls such as thyratron controls and suitable means for urging the electrode rolls toward each other to create the desired welding pressure. All of these features are well known in the art and will not be described further herein.

In addition to the conventional features, the machine is preferably also provided with guide rolls such as the pairs of rolls 25 and 26 (Figure 4) arranged to guide the tube through the machine and center it with respect to the welding rolls. The rolls hold the tube in proper position during its progress through the machine, and the fin members are retained in proper position by reason of the conductor bar 20 and the pressure of the somewhat distorted tube 10 as supplemented if desired by the pressure of the rolls 22 and 23. By this means all of the parts are retained in proper position for welding.

The welding operation is carried out by applying the requisite welding pressure through urging of the electrode rolls 22 and 23 toward each other. The current, controlled in the usual manner, is turned on, and the assembly progressed through the tube preferably by driving the electrode rolls themselves in the usual manner. The welding current thereupon flows from one electrode roll through the wall of the tube in a radial direction into the base 12 of one of the fin members, thence through the conductor 20 to the base 12 of the opposite fin member, through the wall of the tube on the opposite side and to the opposite electrode. The heating effect of the current is at the points of high resistance, where the bases of the fin members contact the inner surfaces of the tube, resulting in the simultaneous production of two welded areas between the inner tube wall and respective fin bases 12.

Some part of the current flows around the circumference of the tube as explained above. However, the resistance of the wall of the tube is such that sufficient current can be caused to flow through the intermediate conductor 20 successfully to weld the fin bases to the interior of the tube, provided that the thickness and diameter of the tube are proportioned as described above. The weld is preferably produced by alternating current controlled in the manner described in my prior Patent No. 2,261,137 aforesaid to produce a series of welded areas which may be either overlapping or closely spaced, the arrangement, however, being such as to give the desired area for the conduction of heat in the manner described in my said patent. After one pair of fins has been welded to the interior of the tube, a succeeding pair of fins may be welded to the interior thereof, the operations being repeated until the desired number of welds and pairs of fins are provided.

The determination of appropriate welding conditions for tubes of various sizes and gauges and fin members of various sizes and gauges may require some experimentation. However, such experimentation is well within the ability of the ordinary person skilled in the welding art, provided that he is guided by the principles disclosed herein. The welding currents must be somewhat greater than those ordinarily employed, because part of the current flowing between the electrodes is ineffective insofar as the welding is concerned, as it merely flows around the circumference of the tube. The following examples of successful welding practices will serve to guide those skilled in the art in practicing my invention.

Steel fins having a thickness of one-hundreth of an inch were welded to the interior of a tube of 20 gauge steel stock with an outside diameter of one inch, using a copper conductor bar one-eighth of an inch thick. The electrodes were one-eighth of an inch wide and eight inches in diameter. The electrode pressure was approximately 1100 pounds. The welding was carried out with 60 cycle alternating current with an effective amperage of approximately 8000 amperes at about six to eight volts. The current was thyratron controlled to flow during welding for two cycles after which the current was turned off for a period of five and a half cycles. The assembly of tube and fin members was progressed through the machine at a speed of approximately six feet per minute, producing a series of welded areas approximately the width of the conductor bar and spaced about five welds per inch.

The description thus far has been concerned with the simultaneous welding of two opposed fins to the inside of a tubular member. It is contemplated that it may be desirable simultaneously to weld more than two such fins in place. Figure 6 illustrates apparatus for practicing the invention when four fins, comprising two pairs spaced 90 degrees apart, are to be positioned in the inside of a tubular member 10 preparatory to welding. Referring to that figure, the conductor bar 20 of Figure 3 now takes the shape of a cruciform 30 in which there are four arms 32 spaced 90 degrees apart. These arms are of equal length and each corresponds substantially in position and length to a radius of the tubular member 10. Each pair of the aligned arms 32 combine in length to exceed by a small amount the normal distance between the inner surfaces of the fin bases 12 when they are positioned within the tube 10 and the latter is undistorted by die members as described below. In this regard the total of the combined conductor width and fin base thickness corresponds to the width of the assembly including the conductor bar 20 previously described that is slightly greater than the internal diameter of the tube. The arms 32 extend the entire length of the fin that is to be welded in place.

To deform the tube 10 to receive the fins 11 and arms 32 of the cruciform 30 four die members 35, 36, 37 and 38 are provided. As shown in Figure 6 they are mounted for simultaneous movement in pairs in and out along radii that lie 90 degrees apart. In this manner the die members 35 through 38 correspond in their action to the jaws of a four jaw chuck in which two jaws can be moved toward and away from each other and the other two jaws moved on a line 90 degrees from the line of movement of the first jaws and in a similar manner.

The members 35 to 38 may be mounted in any suitable apparatus for imparting to them the desired movement and for retaining them in the desired position while the assembly consisting of the cruciform 30 and the four internal fins 11 mounted thereon is placed in position. This assembly is made while the tube 10 is deformed slightly from a true circle as shown in Figure 6. The deformation is accomplished by moving the members 35 through 38 inwardly to the position shown in that figure and then retaining them in place to flatten the adjacent surfaces of the tube and increase the effective diameter of the surfaces between. After the assembly has been completed the members 35 through 38 are retracted and the tube 10 is allowed to resume its original shape except as it is held in a slightly distorted position due to the width of the arms 32.

The assembly of the member 30, the four fin members and the tube 10 is then positioned in a suitable welding machine such as that described above. The welding operation may be carried out in the manner outlined above by causing welding current to flow in a path from one electrode roll through the adjacent wall of the tube in a radial direction into the base 12 of the adjacent fin member, thence through aligned arms 32 to the base 12 of the opposite fin member, through the adjacent wall of the tube on the opposite side and then to the opposite electrode. During this interval no current passes between the other pair of arms 32. Two opposed fins are welded throughout their length in this manner after which the tube is indexed 90° and the electrode rolls weld the second pair of aligned fins to the tube 10. When this is completed all four fins are secured in place.

The conductor bar 20 and the cruciform conductor 30 are, in each case, removed from the tube after the welding operation has been completed by placing the tube in the deforming mechanism of Figure 3 or Figure 6 as the case may be and deforming the tube until the conductor may be slid freely through the fin channels and out of the tube. When the tube is then allowed to resume its original shape it will have welded thereto on its interior face two or more fins 11. It will be apparent that the invention is not limited in its scope to applying the number of fins that may be supported within the tube at any one time by the conductor bar 20 or the arms 32. Rather, it is possible to weld into the tube any reasonable number of fins as for instance the eight shown in Figure 1. This is accomplished by merely mounting in the tube in succession, fins, either in pairs as in Figure 3 or in fours as in Figure 6, until the required total number are secured in place. It also should be pointed out that the invention is not limited to the assembly for welding of either two or four fins but that the conductor member may take other shapes than those shown to support other numbers of fins.

The two conductor members already described and shown at 20 and 30 are of permanent form and may not be varied in their cross-sectional dimension. In Figure 7 and 8 there is shown a modified form of construction for practicing the invention in which the conductor bar, here indicated at 40, takes the form of an expansible mandrel. In such a construction the conductor member comprises two arms 42 and 43 that at their outer ends engage fin bases 12 as previously described in connection with the conductor bar 20. Inwardly they are shaped as shown in Figure 7 so that the arm 42 has a channel portion 44 extending the length thereof and adapted to receive a tongue portion 45 integral with the arm 42. The tongue and channel construction is to maintain the arms 42 and 43 in alignment with each other throughout their length. The members engage with each other along a generally axial surface 47 and are adapted to slide with respect to each other therealong. This surface, as shown in Figure 8, is somewhat inclined with respect to the axis of the tube. Thus as the arms are slid axially of each other in one direction while they are in the tube they increase in their total width and ultimately will force outwardly that portion of the tube with which they are in engagement. When they are moved in the opposite direction their outer edges come closer to each other and may have a total width substantially less than the internal diameter of the tube.

In the latter position described above the expanding conductor bar of Figure 7 is mounted in a tube 10 with the fins 11 there shown mounted on its outer edges. The conductor bar is then expanded as described above until the tube 10 has been deformed a slight amount so that its natural resiliency securely holds the fins 11 with the proper pressure for welding. At this time the conductor bar members 42 and 43 are locked in position and the welding operation carried through as described in relation to the conductor bar 20. After the weld is complete the arms 42 and 43 are retracted with respect to each other and are removed. This bar 40 also may be used in welding successive pairs of fins within the tube 10 until a considerable number such as the eight shown in Figure 1 are secured therein.

Reference is hereby made to my copending divisional application Serial No. 95,764, filed May 27, 1949, which contains claims to the apparatus disclosed herein.

Various changes and modifications may be made herein without departing from the scope of my invention. It is therefore to be understood that my patent is not limited to use of the preferred embodiments of the invention described herein, or in any manner other than the scope of the appended claims.

I claim:

1. The method of welding fins with a base portion to the inside of a current conducting tubular member which includes the steps of distorting said member to increase its dimension along one diameter, mounting within said tubular member an assembly of slightly greater width than the corresponding undistorted diameter of said member and comprising a current conducting fin with its base adjacent the inner tubular wall and a metallic conductor member adapted to conduct a welding current from said base to the opposite tube wall, allowing said member to return from its distorted position to the extent permitted by said assembly, positioning an external welding electrode against said member over the region of said base and a second welding electrode against said member opposite said first member and causing a welding current to flow between said electrodes through the walls of said tubular member, said base portion and said conductor bar.

2. The method of welding fins with a base portion and an upstanding portion to the inside of a current conducting tubular member which includes the steps of distorting said member to increase its dimension along one diameter, mounting within said tubular member an assembly of slightly greater width than the corresponding undistorted diameter of said member and comprising two current conducting fins with their bases adjacent the inner tubular wall and a metallic conductor member adapted to conduct a welding current from one base to the other, said conductor member being formed of such material and so proportioned that it offers substantially less resistance to passage of current from one base to the other than does said tube, allowing said member to return from its distorted position to the extent permitted by said assembly, positioning an external welding electrode over the region of each of said bases, and causing a welding current to flow between said electrodes through the walls of said tubular member adjacent the base portion of said fin members, said base portions and said conductor bar.

3. The method of welding current conducting fins each including a base portion to the inside of a thin walled current conducting tubular member which comprises the steps of distorting said member to increase its dimension along one diameter, positioning a plurality of fins in said tube with the base portions adjacent the tube inner wall, inserting a metallic conductor bar in said tube with opposite edges adjacent the base portions of said fins, said fin bases and said conductor member having a combined width slightly greater than the corresponding undistorted internal diameter of said member and extending axially within said member, permitting said member to return from its distorted position to the extent permitted by said positioned fins and bar, engaging the exterior of the tubular member in the regions lying immediately outside of the zone of said base portions by a pair of oppositely disposed electrodes, causing a welding current to flow between said electrodes through the walls of the tube and the base portions of said fin members adjacent the zones of contact of said electrodes with the exterior of said tubular member and through said conductor bar, and during the welding operation moving the assembly of tubular member, fin members and conductor bar with respect to said electrodes continuously to weld successive portions of the bases of said fin members to the tube as they reach the welding zone between the electrodes.

4. The method of welding current conducting fins, each including a base portion and an upstanding portion to the inside of a thin walled current conducting tubular member which includes the steps of distorting said member to increase its dimension along one diameter, positioning a plurality of fins in said tube with the base portions adjacent the tube inner wall, inserting a metallic conductor bar in said tube with opposite edges adjacent the base portions of said fins, said fin bases and said conductor member having a combined width slightly greater than the corresponding undistorted internal diameter of said member and extending axially within said member, permitting said member to return from its distorted position to the extent permitted by said positioned fins and bar, engaging the exterior of the tubular member in the regions lying immediately outside of the zone of said base portions by a pair of oppositely disposed electrodes, applying pressure by said electrodes to exert welding pressure against said member adjacent the bases of said fin members, causing a welding current to flow between said electrodes through the walls of the tube and the base portions of said fin members adjacent the zones of contact of said electrodes with the exterior of said tubular member and through said conductor bar, and during the welding operation moving the assembly of tubular member, fin members and conductor with respect to said electrodes continuously to weld successive portions of the bases of said fin members to the tube as they reach the welding zone between the electrodes.

5. The method of welding the base portion of four current conducting fins spaced 90 degrees apart to the inside of a current conducting tube which includes the steps of applying pressure inwardly to four substantially equally spaced longitudinal areas of said tube to distort the intermediate areas outwardly and increase their diameters, mounting within said tube at said intermediate areas a current conducting member with arms aligned in two pairs 90 degrees apart and having positioned at each of their ends the base of a fin member to make an assembly exceeding in width the internal diameter of said tube, allowing said tube to return from its distorted position to the extent permitted by said conductor and said fin base portions, and passing a welding current through said tube, said fins and said conductor to weld the fins to the inside of said tube.

6. The method of welding the base portion of four current conducting fins spaced 90 degrees apart to the inside of a current conducting tube which includes the steps of applying pressure inwardly to four substantially equally spaced longitudinal areas of said tube to distort the intermediate areas outwardly and increase their diameters, mounting within said tube at said intermediate areas a current conducting member with arms aligned in two pairs 90 degrees apart and having positioned at each of their ends the base of a fin member to make an assembly exceeding in width the internal diameter of said tube, allowing said tube to return from its distorted position to the extent permitted by said conductor and said fin base portions, positioning welding electrodes on opposite sides of the exterior of said tube adjacent opposed fin base portions and causing a welding current to flow from one electrode to the other through those areas of said tube adjacent the fins, said fin base portions and said conductor.

JOHN W. BROWN, Jr.

REFERENCES CITED

The following references are of record in the file of this patent:

UNITED STATES PATENTS

| Number | Name | Date |
|---|---|---|
| 1,995,368 | Sunnen | Mar. 26, 1935 |
| 2,032,134 | Larkin | Feb. 25, 1936 |
| 2,057,017 | DeGanahl | Oct. 13, 1936 |
| 2,261,137 | Brown | Nov. 4, 1941 |
| 2,298,249 | Brown | Oct. 6, 1942 |
| 2,355,621 | Brown | Aug. 15, 1944 |